(12) United States Patent
Fiore

(10) Patent No.: US 6,985,699 B2
(45) Date of Patent: Jan. 10, 2006

(54) EFFICIENT AND OPTIMAL CHANNEL ENCODING AND CHANNEL DECODING IN A MULTIPLE ACCESS COMMUNICATIONS SYSTEM

(75) Inventor: Paul D. Fiore, Chelmsford, MA (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 426 days.

(21) Appl. No.: 10/414,784

(22) Filed: Apr. 16, 2003

(65) Prior Publication Data

US 2004/0209570 A1    Oct. 21, 2004

(51) Int. Cl.
*H04B 15/00* (2006.01)
*H04Q 7/20* (2006.01)

(52) U.S. Cl. .................. 455/62; 455/422.1; 455/452.2; 375/149

(58) Field of Classification Search .................. 455/62, 455/65, 422.1, 450–453, 500, 509, 513; 375/348, 375/233, 262, 149, 316, 346; 370/207, 209, 370/210, 338; 708/514; 714/755, 790, 795
See application file for complete search history.

(56) References Cited

U.S. PATENT DOCUMENTS

| | | | | |
|---|---|---|---|---|
| 4,894,844 | A | * 1/1990 | Forney, Jr. | 375/269 |
| 5,467,374 | A | * 11/1995 | Chennakeshu et al. | 375/340 |
| 5,488,635 | A | * 1/1996 | Chennakeshu et al. | 375/340 |
| 5,742,643 | A | 4/1998 | Reeves et al. | |
| 5,832,044 | A | * 11/1998 | Sousa et al. | 375/347 |
| 6,490,313 | B1 | * 12/2002 | Ganesh et al. | 375/130 |

OTHER PUBLICATIONS

Moshavi, Multi-User Detection For DS-CDMA Communications; IEEE Communications Magazine; Oct., 1996; pp. 124-136.

Mow, Fast Decoding Of The Hexagonal Lattice With Applications To Power Efficient Multi-Level Modulation Systems; Singapore ICCS/ISITA '92; pp. 370-373.

Learned, et al; Low Complexity Optimal Joint Detection For Oversaturated Multiple Access Communications; IEEE Transactions On Signal Processing, vol. 45, No. 1; Jan. 1997; pp. 113-123.

Multiuser Communications; Digital Communications, Fourth Edition; pp. 896-898.

Wilson; Multidimensional Lattice-based Constellations For The AWGN Channel; Digital Modulation And Coding; Chapter 3; pp. 196-203 and 268-279.

Lee, et al; Capacity And Modulation; Digital Communication, Second Edition, Section 8.7; pp. 344-357.

Zapata, et al; Fast Fourier Transform For Hexagonal Aggregates, Journal of Mathematical Imaging and Vision 12, 183-197, 2000; Kluwer Academic Publishers, Netherlands.

* cited by examiner

Primary Examiner—Benny Q. Tieu
(74) Attorney, Agent, or Firm—Walter Dawson

(57) ABSTRACT

A method of channel encoding and channel decoding in a multiple access communication system wherein the channel decoding requirements increase linearly and not exponentially as the number of users increase. A channel encoder converts alphabetic symbols into a preselected geometric representation of a hexagonal lattice known as a symbol constellation. A channel decoder converts the received symbol constellation into a replication of the alphabetic symbols. Each user has a specially defined symbol set that allows the linear-complexity decoding operation.

23 Claims, 11 Drawing Sheets

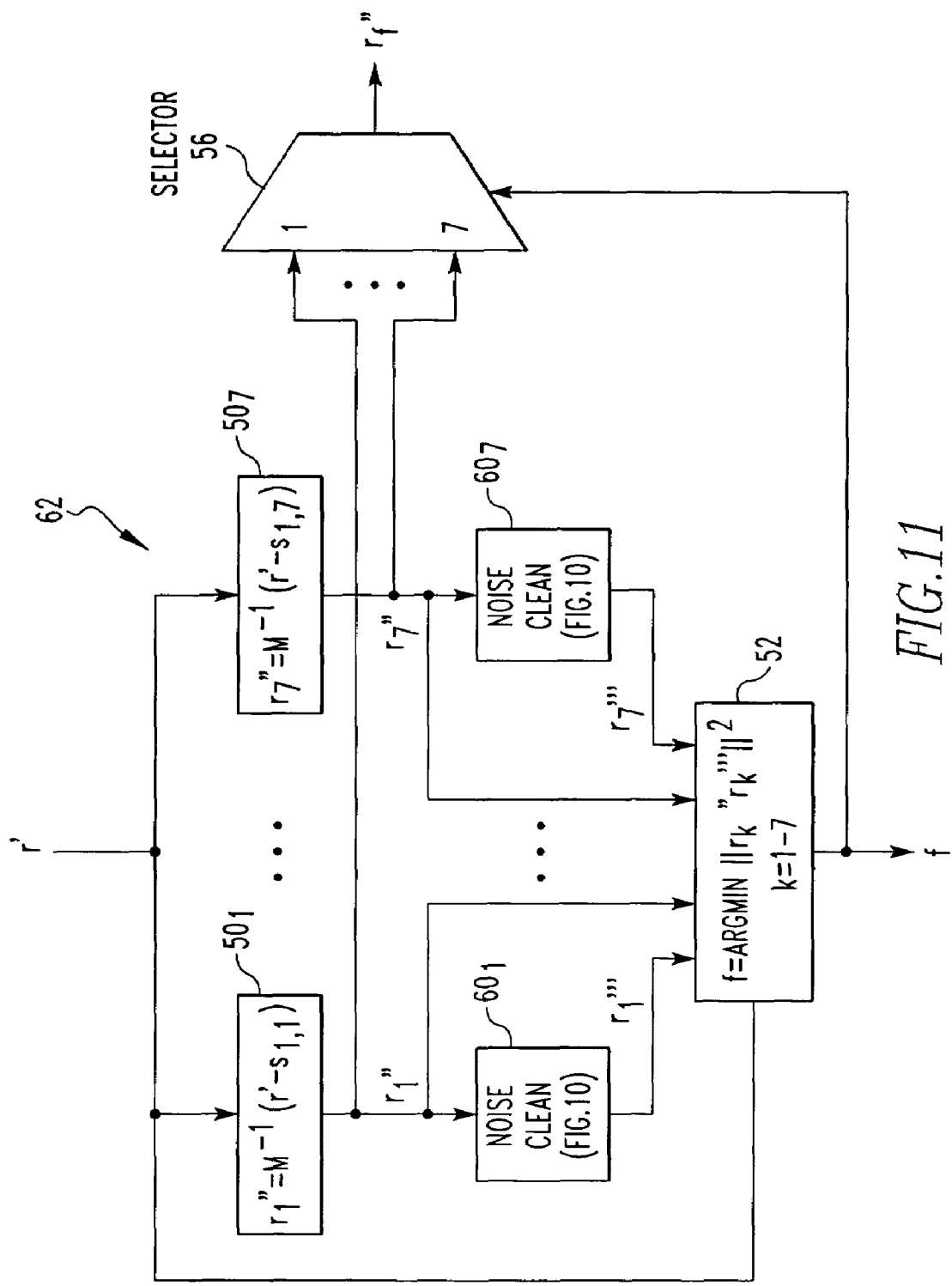

EFFICIENT AND OPTIMAL CHANNEL ENCODING AND CHANNEL DECODING IN A MULTIPLE ACCESS COMMUNICATIONS SYSTEM

BACKGROUND OF THE INVENTION

1. Field of the Invention

This invention relates generally to a multiple access communication (MAC) system, and in particular, to an apparatus and method of channel encoding and channel decoding using a multiuser symbol constellation confined to a hexagonal lattice with each user having a defined symbol set.

2. Description of Related Art

A multiple access communication (MAC) system is a communication system in which a large number of users share a common communication channel to transmit information to a common receiver. Examples of this are the uplink path in a mobile-to-cellular phone tower or in a ground-to-satellite communication system. While the goals of MAC system designs can vary, they are generally concerned with efficient use of channel bandwidth, ease of decoding multiple user transmissions, providing a mechanism for users to enter the system, and reallocating resources when users leave the system. These goals are often at odds with one another whereby optimizing one criterion generally impairs or diminishes the others. For example, optimum multiuser coding sets, to make the most efficient use of a channel, typically require an extremely expensive decoding procedure, which has complexity which grows exponentially with the number of users. These approaches typically only can work with a very small (i.e. less than 10) number of users.

It should be understood that the reference to the term 'users' is not limited to a number of individuals with wireless communication devices. For purposes of this invention, 'users' is broadly defined as any source of information bits. These bits can be in relation to reading/writing to a hard drive, processing the feeds from video cameras, data transfer on networks and inter-component communications between integrated circuits. Thus the reference to user is provided for convenience and not intended to be limiting.

Other approaches, such as disclosed in R. E. Learned, A. S. Willsky, and D. M. Boroson, "Low Complexity Optimal Joint Detection for Oversaturated Multiple Access Communications", IEEE Transactions on Signal Processing, Vol. 45, No.1, pages 113–123, January, 1997, includes tree-structured cross-correlation symbols having decoding algorithms with complexity which grows polynomially with the number of users. Another well known coding set, quadrature amplitude modulation (QAM), can be decoded with complexity which grows only linearly with the number of users, but the spectral efficiency of this approach is lower than the previous approach. Effective MAC systems design then becomes the problem of balancing the tradeoff between these conflicting goals.

U.S. Pat. No. 5,790,606 issued Aug. 4, 1998 to Paul W. Dent and assigned to Ericsson Inc. of Research Triangle Park, N.C., discloses a method of communication between a plurality of spatially distributed mobile radio units and a radio network using the same radio frequency, comprising the steps of transmitting information symbols simultaneously from the mobile units on the same radio frequency, sampling a radio wave on the same radio frequency at different points in space using a plurality of spatially distributed antennas to produce spatial signal samples, jointly processing the spatial signal samples using an equalizer adapted to resolve intersymbol interference between the information symbols in order to reproduce the transmitted information symbols. The information symbols transmitted from the mobile units include at least one known symbol pattern within a given area which is different for each co-channel mobile unit. The equalizer calculates correlations with the orthogonal symbol patterns using an orthogonal transform which may be a Fast-Walsh transform, a Fast-Fourier transform, or a Walsh-Fourier transform. The disadvantage of this approach is that a plurality of spatially distributed antennas at the receiver is required.

A successive interference cancellation (SIC) detector known in the prior art first decodes a user with the most power, user N, and then this information is used to decode user N-1, etc. Such an SIC detector is described in a paper by Shimon Moshavi entitled "MULTI-USER DETECTION FOR DS-CDMA COMMUNICATIONS", IEEE Communications Magazine, October 1996, P. 124–136.

The importance of a hexagonal lattice in a single user signal processing application is described in a paper by W. H. Mow entitled "FAST DECODING OF THE HEXAGONAL LATTICE WITH APPLICATIONS TO POWER EFFICIENT MULTI-LEVEL MODULATION SYSTEMS, IEEE, ICCS/ISITA, Singapore, 1992, P. 370–373. This decoding algorithm is constructed based on the fact that a hexagonal lattice can be partitioned into two rectangular sub lattices, which allows additive channel noise to be removed in an extremely efficient manner. Of course, the disadvantage of Mow's approach is that it is suitable only for a single-user system, such as a dedicated modem.

What is needed is a more efficient communications scheme for multiple access systems that allows multiple users to efficiently transmit and receive information while reducing the effects from noise.

SUMMARY OF THE INVENTION

Accordingly, it is therefore an object of this invention to provide an efficient channel encoder scheme and a channel decoder scheme for multiple access communication systems.

In one embodiment the invention is a method of channel encoding in a multiple access communications system comprising the steps of encoding alphabetic symbols from a plurality of users into a predetermined geometric representation of a symbol constellation in a scale recursive manner wherein a combined receive signal always falls onto a hexagonal lattice. In addition, wherein the step of encoding alphabetic symbols into a predetermined geometric representation of a symbol constellation comprises the step of providing a symbol set ($S_n$) for each of the users n, where n=1 . . . N; wherein N is the total number of users (e.g.: a fixed number) and n is an index variable.

An additional feature comprises the further the step of creating a plurality of virtual users and at least one real user, wherein each real user comprises at least one of the virtual users. Furthermore, wherein each of the virtual users has a virtual user symbol set, and each real user has a real user symbol set, and wherein each real user symbol set is a direct sum of at least one virtual user symbol set.

Another embodiment is a method of channel encoding and channel decoding in a multiple access communications system comprising the steps of encoding alphabetic symbols from a plurality of users into a predetermined geometric representation of a symbol constellation in a scale recursive manner wherein a combined receive signal always falls onto a hexagonal lattice, and decoding a received predetermined geometric representation of a multiuser symbol constellation of each of the users into a replication of each user's individual symbol constellation comprising a number of computations that are linearly proportional to the number of the users.

In addition, a feature includes the method of the present invention wherein the means for decoding comprises performing a series of decoding steps wherein a least most powerful remaining user is decoded and removed at each of the steps.

Yet a further variation of the present invention is a method of channel decoding in a multiple access communication system comprising the steps of decoding a received signal comprising a plurality of users into a predetermined geometric representation of a multiuser symbol constellation for each of the users to obtain a replication of an individual symbol constellation for each of the users, wherein the decoding comprises performing a series of decoding steps wherein a least most powerful remaining user is decoded and removed at each of the steps.

In addition, the method of the present invention further comprises the step of removing channel noise from the received signal by moving the received signal onto a hexagonal lattice. Furthermore, wherein the step of removing noise comprises the step of partitioning the hexagonal lattice into two rectangular sublattices.

In one embodiment, the method of decoding the least most powerful user comprises the steps of testing each transmitted symbol, $S_{1,k}$, for k=1, . . . , 7, to determine the least most powerful user symbol by subtracting each possible symbol from a noise cleaned received signal, r', de-rotating and de-scaling a difference resulting from the subtracting by multiplying each the difference by a matrix, $M^{-1}$, performing a noise clean operation on each of the possible least most powerful users received symbols, $r_k''$, by projecting the received signals, $r_k''$, onto a nearest hexagonal lattice point producing a set of hypothesized receive vectors with the least most powerful user removed, $r_k'''$, and comparing a squared distance, $|r_1''-r_1'''|^2$, . . . , $|r_7''-r_7'''|^2$, and choosing symbol f corresponding to a minimum squared distance as the least most powerful user's symbol and generating the receive vector, $r_f''$, for a next decoding step. In addition, wherein the step of multiplying each difference by a matrix, $M^{-1}$, comprises the step of forming the matrix, $M^{-1}$, by inverting a matrix, M, which is the matrix that scales and rotates the constellations from one user to a next most powerful user.

Furthermore, the present invention describes the step of removing channel noise from the received signal by partitioning the hexagonal lattice into two sublattices displaced by a vector, d, calculating a lattice index vector, $a_b$, for projecting the received signal, r, onto one of the sublattices by solving an equation $a_b$=round ($C^{-1}$ (r–bd)), for b= 0,1 where, $$C = \begin{bmatrix} 1 & 0 \\ 0 & \sqrt{3} \end{bmatrix}$$

is a sublattice aspect ratio, calculating possible cleaned received vectors, $r'_0$ and $r'_1$, by solving an equation $r'_b=Ca_b+bd$, for b=0,1, and determining which one of the cleaned received vectors, $r'_0$ and $r'_1$, is closer to the received vector, r, in a square error sense.

One embodiment of the invention is a channel encoder and channel decoder for multiple access communication systems having a plurality of users, comprising a plurality of channel encoders that encode symbols from each of the users into a multiuser symbol constellation for each of the users, wherein the multiuser symbol constellation is a subset of a hexagonal lattice, and a channel decoder that decodes the multiuser symbol constellation into the symbols for each of the users. And, wherein the plurality of channel encoders that encode symbols from each of the users into a multiuser symbol constellation for each of the users uses a recursion equation $S_n=M^{n-1}S_1$ wherein users are numbered n=1 . . . $_N$.

A further aspect is the channel encoder and channel decoder, wherein the channel encoders are contained within a corresponding plurality of transmitters, each of the transmitters comprising a source encoder and a modulator coupled to the channel encoder, wherein a modulated output from each modulator is transmitted by an antenna or directly coupled to the channel decoder.

In another embodiment, the channel decoder is contained within a receiver section, the receiver section comprising an antenna coupled to a demodulator, the demodulator coupled to a reconstruction section, the reconstruction section coupled to the channel decoder, and a plurality of source decoders for each of the users coupled to the channel decoder. The invention may also include a timing and power control section coupled to the demodulator and the channel decoder, wherein the timing and power control section transmits power and timing information to a transmitter.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which:

FIG. 11 shows a flow chart for the step of least powerful remaining user decoding in FIG. 9.

DESCRIPTION OF THE ILLUSTRATIVE EMBODIMENTS

Figure 1:
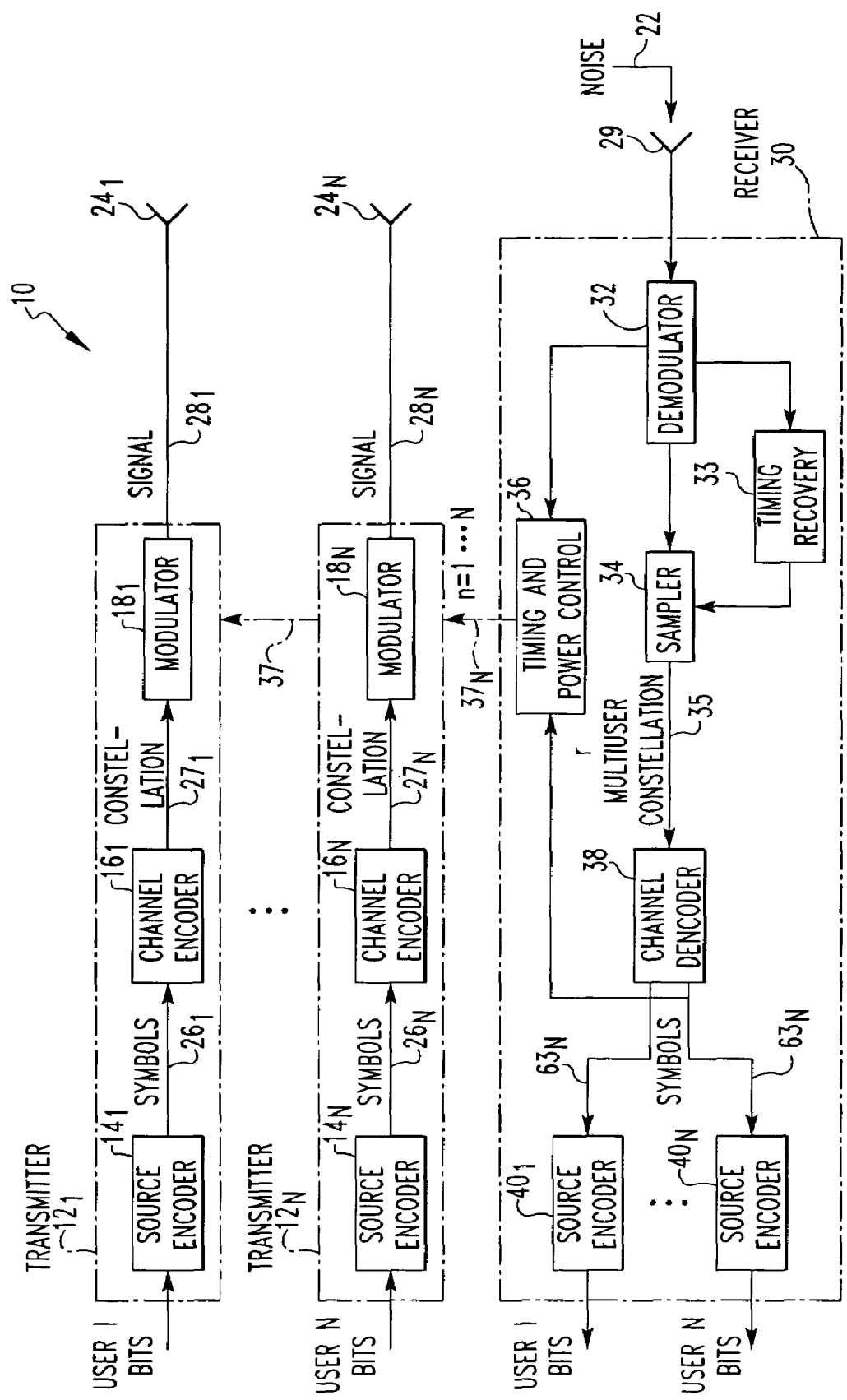
FIG. 1 is a block diagram of a multiuser access communication system according to the present invention.

Referring to FIG. 1, a block diagram is shown of a typical multiuser access communication system 10. An information source generates a sequence of bits at some rate, and the multiple transmitters $12_1$–$12_N$ and single receiver 30 combination has to allow the information to be sent reliably across free space via antennas $24_1$–$24_N$ or via a hard wired connection. The preferred embodiment is a wireless implementation, wherein the signal output $28_1$–$28_N$ is transmitted by a plurality of corresponding antennas $24_1$–$24_N$ that is transmitted into free space and combined and picked up by the receiver antenna 29. However, it is readily apparent to those skilled in the art that the output of the signals $28_1$–$28_N$ can be a wired connection without employing antennas or wireless interference, thus reducing noise 22. Note, that as defined herein, the term 'users' refers to any multiple source of information bits.

There are multiple transmitters $12_1$–$12_N$, each corresponding to a user of the system 10, all attempting to communicate aggregated information to the single receiver 30. The multiple user transmissions $28_1$–$28_N$ represent corresponding MAC channels, and are transmitted by corresponding antennas $24_1$–$24_N$. However all these signals are added together and received by a single antenna 29 along with noise 22, thereby greatly complicating the decoding task performed by the receiver 30. Typically, the channel encoders $16_1$–$16_N$ for each user transmitter $12_1$–$12_N$ differ in some way, to allow the channel decoder 38 in the receiver 30 to separate the different user information bits.

It is readily apparent that the connection between the encoded waveforms of the transmission sections $12_1$–$12_N$ and the receiver 30 shown as a wireless communication scheme employing some form of transmitter antennas $24_1$–$24_N$ for transmitting the encoded information and some type of receiver antenna 29 receiving the encoded information, can also be implemented with a direct wired connection (not shown). Thus the antennas $24_1$–$24_N$, 29 are not to be considered a limitation as the signals $28_1$–$28_N$ can be coupled to a wired connection that is directly coupled to the receiver 30.

Within each of the transmitters $12_n$, the source encoder $14_n$ converts information bits into symbols $26_n$. The symbols can be assembled into an alphabet, wherein the term "alphabet" refers to unique identifiers or collection of symbols. The source encoder $14_n$ often is used to compress the information bit stream or add error-control redundancy coding, all using well-known, existing methods. The number of symbols $26_n$ and the relative rates of the symbols versus the rate of the information bits also affect many characteristics of the communication scheme. For example, if the number of symbols $26_n$ in the alphabet is a power of two, say $2^q$, then contiguous blocks of q bits can be grouped together and used to define a particular symbol, and the symbol rate is q times slower than the information bit rate. As another example, if the number of symbols in the alphabet is not a power of two, then more sophisticated mapping methods, such as arithmetic coding, are generally employed, so that on average no bandwidth is wasted. The stream of symbols are considered to be the baseband signal to be transmitted.

Within the transmitter $12_n$, the channel encoder $16_n$ converts the alphabetic symbols into a geometric representation, known as the symbol constellation $27_n$. Each symbol can be thought of as a point in a vector space. The particular locations of the symbols in the vector space determine many characteristics of the communication scheme.

The modulator $18_n$ within the transmitter $12_n$ converts symbols, represented by their coordinates in the symbol vector space, into waveform $28_1$–$28_N$ that are transmitted via antennas $24_1$–$24_N$ into free space for the wireless embodiment. Of course, for a given channel many modulation types typically are in use. For example, for a radio frequency (RF) channel, the modulator $18_n$ might generate an amplitude modulated (AM) or frequency modulated (FM) signal. In these cases, the waveform is regarded as a narrowband signal. Another example is that the modulator $18_n$ might produce a spread spectrum signal, as is done for the IS-95 cell phone networks, and also many military communication systems.

Within the receiver 30, the waveforms from the transmitters $12_1$–$12_N$ are received by the antenna 29 and typically converted by the demodulator 32 to an analog representation of the baseband symbol constellation sequence. The demodulator 32 thus is an inverse operation of the corresponding modulator $18_1$–$18_N$. Often within the receiver 30 are the timing recovery 33 and sampler 34 functions, which must determine when to sample the output of the demodulator 32 to reconstruct the baseband symbol sequence, wherein this can be termed the reconstruction section.

The channel decoder 38 converts the received baseband symbol multiuser constellation 35 stream into a replication of the symbol alphabetic stream, by performing, in an extremely efficient and novel way, the inverse operation of all the channel encoders $16_1$–$16_N$ in the transmitters $12_1$–$12_N$. Finally, the source decoder $40_1$–$40_N$ performs the inverse operation appropriate to the source encoder $14_1$–$14_N$ of the transmitter $12_1$–$12_N$, using known methods.

In MAC systems as illustrated in FIG. 1, it is often important to coordinate the multiple users. This may be done using information provided by the receiver 30, typically using a low bandwidth side channel or timing and power control block 36 and channel 37. Generally, this control channel 37 provides feedback to the transmitters $12_1$–$12_N$ on power levels and timing, so that each user signal arrives at the receiver 30 with known power and timing. Such a control channel 37 may be necessary depending on the signal $28_1$–$28_N$ characteristics. For example, with IS-95, each users' transmitted waveform undergoes variable delay and attenuation as the mobile unit moves relative to the receiver. Power and timing can be measured at the receiver, which then communicates to each transmitter over its control channel 37 about how best to alter its waveform. As in the IS-95 implementation, the current invention requiresthe timing and power control block 36 and channel 37 to cause the transmitters $12_1$–$12_n$ to synchronize, so that their symbols are aligned in time. Also, as does IS-95, the power levels of each transmitter $12_1$–$12_N$ in the present invention will be required to be set to certain particular levels, as described herein.

Multiuser symbol sets with favorable decoding properties according to the teachings of the present invention are as follows: Each user n is given a set of 7 symbols, which are vectors in a two dimensional space. The 7 symbols represent the hexagonal structure including a center point. The symbol set for user n is denoted by a 2×7 matrix $S_n$. For user n, the $k^{th}$ column of $S_n$ is the symbol $S_{n,k}$. In the present invention the user symbols $S_n$ are optimally chosen as will be described later. For each time period, user n sends one of its symbols, such as the $m^{th}$ one. Since the particular symbol m depends on the user n, it is denoted by $S_{n,k}$ with k=m(n).

Because of the symbol timing synchronization, at each symbol time instant, the combined received signal consists of the sum of the transmitted symbol vectors, one from each user. The received signal is assumed to be corrupted with independent, identically distributed (IID) additive white Gaussian noise (AWGN), and the received vector 35 after the sampler 34 in FIG. 1 is given by $$r = \sum_{n=1}^{N} S_{n,m(n)} + w \qquad (1)$$

where w is the IID AWGN receiver noise. The set of all possible r vectors for the noise free case is termed the multiuser symbol constellation. This constellation is generated by considering all possible sums of elements from each users' symbol set (mathematically, the operation is known as a "direct sum" of the individual symbol sets, and is denoted by "⊕").

Although for single-user channels (i.e. modems) the design of optimal symbols is well known, the use of the optimal single-user symbols cannot be optimally used for multiple users because the single-user constellation is generally not "decomposable" into a direct sum of constellations. Some suboptimal single-user symbol sets can be decomposed. For example, a p×p QAM constellation can be decomposed into the direct sum of two constellations, if and only if p is not prime. Clearly, any factorization of p into the product of N integers, each greater than one, can yield QAM constellations for N users in a MAC scheme. Since existing approaches such as the IS-95 implicitly use a QAM multiuser constellation, the new method described herein is compared to QAM to show the benefits of the new method.

For optimal decoding, if each user's symbols are all equally likely to be transmitted, then the optimal receiver, in the maximum likelihood sense, chooses the set of symbols whose sum is closest to the received vector r. For arbitrary symbol sets, this approach can lead to a computationally intractable algorithm, requiring an exponential number of combinations to be tested.

Figure 2:
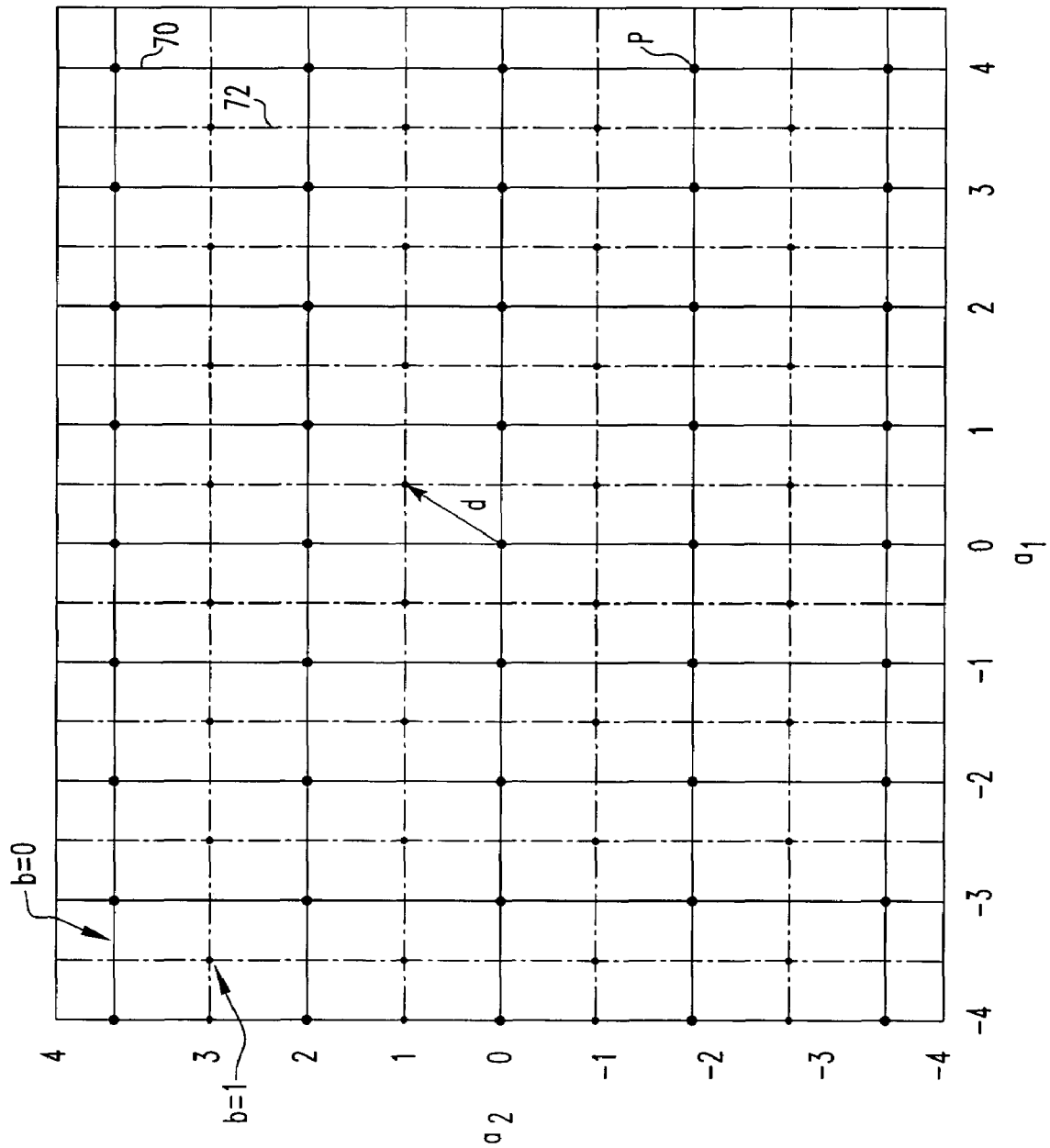
FIG. 2 shows portions of the two rectangular sublattices of a two dimensional hexagonal lattice.

Referring to FIG. 2, a special multiuser symbol constellation used herein is a subset of a hexagonal close pack lattice applied to multiple access communication systems. The hexagonal close pack lattice consists of the points p which can be written in the form p=Ba, where a is a two dimensional integer vector, and B is a specific 2×2 matrix of basis vectors for the lattice in FIG. 2, given by $$B = \begin{bmatrix} 1 & \frac{1}{2} \\ 0 & \frac{\sqrt{3}}{2} \end{bmatrix} \qquad (2)$$

Any arbitrary global scaling, rotation, or flipped coordinate axes also results in a hexagonal close pack lattice.

The asymptotic benefits of using a hexagonal lattice is quantified as opposed to a square lattice (which is the basis of QAM). The minimum distance between symbols for each lattice is set to one. For the square lattice, having an (L+1)×(L+1) grid, there are $(L+1)^2$ symbols, in an area of $L^2$. The symbol density is (asymptotically as L→∞) the ratio $(L+1)^2/L^2$, which is asymptotically equal to one. In contrast, consider the hexagonal lattice having symbols contained in a "cannonball stack" whose base contains L+1 symbols. There are a total of 1+2+ . . . +(L+1)=(L+1) (L+2)/2 symbols. The area of the triangle enclosed by these symbols is $\sqrt{3}L^2/4$, so the symbol density is $2(L+1)(L+2)/(L^2\sqrt{3})$, which is asymptotically equal to $2/\sqrt{3}$=1.1547. Thus, there are approximately 15% more symbols per unit area with the hexagonal lattice versus a square lattice of the same minimum distance, which means that the hexagonal lattice utilizes the channel more efficiently than the rectangular lattice.

An important property of the multidimensional hexagonal lattice is that it consists of the union of a number of rectangular lattices. For FIG. 2, the hexagonal lattice is decomposed into the union of two rectangular lattices 70, 72 as given by $$r = Ca + bd \qquad (3)$$

Where a is a 2×1 integer vector, b∈{0,1}, $$C = \begin{bmatrix} 1 & 0 \\ 0 & \sqrt{3} \end{bmatrix} \qquad (4)$$

and $$d = \frac{1}{2}\begin{bmatrix} 1 \\ \sqrt{3} \end{bmatrix} \qquad (5)$$

Because C is diagonal, the two sublattices are rectangular and aligned with the coordinate axes. The two sublattices 70, 72 are displaced from each other by the vector d. The binary variable b controls the choice of sublattice.

Next, channel noise 22 in the Receiver 30 must be considered, as white noise, and is a typical aspect of wireless transmissions that diminishes reception capabilities. Typically the ideal receive constellation is corrupted with noise that is IID AWGN. A received symbol r will therefore not fall exactly on the hexagonal lattice. The optimal noise rejection strategy (in the maximum likelihood sense) is to find the point in the noise-free constellation closest to r. Once the hexagonal lattice is defined, the individual user symbol sets are determined so that in the noiseless case, any combination of transmitted symbols results in the received vector r belonging to the lattice. For the first user, the symbol set is chosen to consist of the origin and the points in the hexagonal lattice adjacent to it. These adjacent points correspond to r's with $\|r\|_2^2$=1. Thus, there are a total of seven symbols in the symbol set, and the first user's symbols set is given by $$S_1 = \begin{bmatrix} 0 & 1 & \frac{1}{2} & -\frac{1}{2} & -1 & -\frac{1}{2} & \frac{1}{2} \\ 0 & 0 & \sqrt{3}/2 & \sqrt{3}/2 & 0 & -\sqrt{3}/2 & -\sqrt{3}/2 \end{bmatrix} \qquad (6)$$

Figure 3:
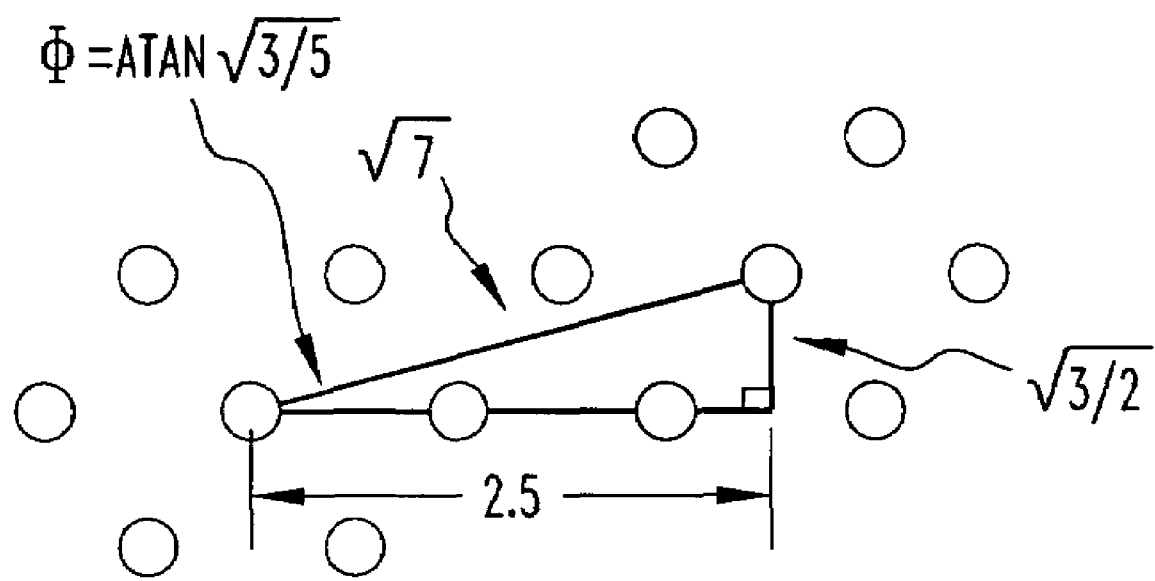
FIG. 3 shows a displaced copy of a first users symbol set constellation by calculation of rotation and scale for multiple users.

Referring to FIG. 3, a displaced copy of a first user's symbol set constellation is obtained by calculation of rotation and scale for multiple users. The second user's symbol set $S_2$ is similar to the first user's, except that each point is scaled and rotated about the origin by specially chosen amounts. To determine the rotation and scaling, the second user's first nonzero symbol is chosen to be positioned so that the displaced copy of the first user's constellation is as shown in FIG. 3. FIG. 3 shows that the rotation angle should be $\phi = \tan^{-1}(\sqrt{3}/5)$ and the scale factor should be $\sqrt{7}$. Thus, a recursion is defined, where user k's symbols are derived from user (k–1)'s symbols via $$S_k = MS_{k-1} \quad (7)$$

where, $$M = \frac{1}{2}\begin{bmatrix} 5 & \sqrt{3} \\ -\sqrt{3} & 5 \end{bmatrix} \quad (8)$$

Figure 4:
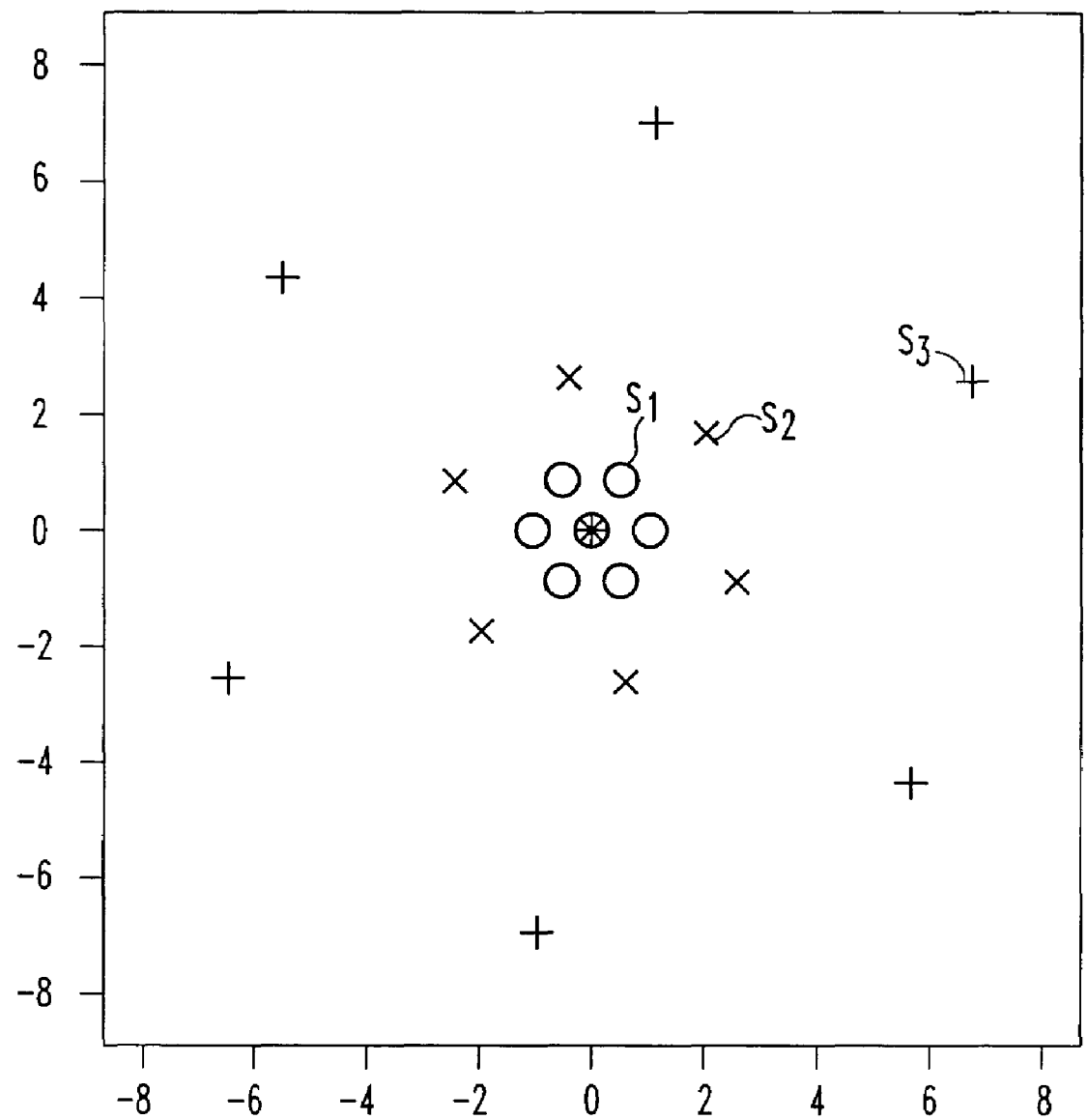
FIG. 4 is a graph of symbol sets for three users where User 1 is "o", User 2 is "x", and User 3 is "+"

Referring now to FIG. 4, a graph of symbol sets $S_1$ through $S_3$ are shown where user 1 is "o", user 2 is "x" and user 3 is "+" illustrating the 7 symbols sharing a common center point. This nonobvious multiuser constellation assignment method illustrated by FIG. 4 and given in equations (6, 7, and 8) is one of the central features of the invention. One skilled in the art will recognize that $S_1$ can be rotated, scaled, shifted, reflected or permuted and the method still applies. (Here we picked a particular $S_1$ as an example).

Figure 5:
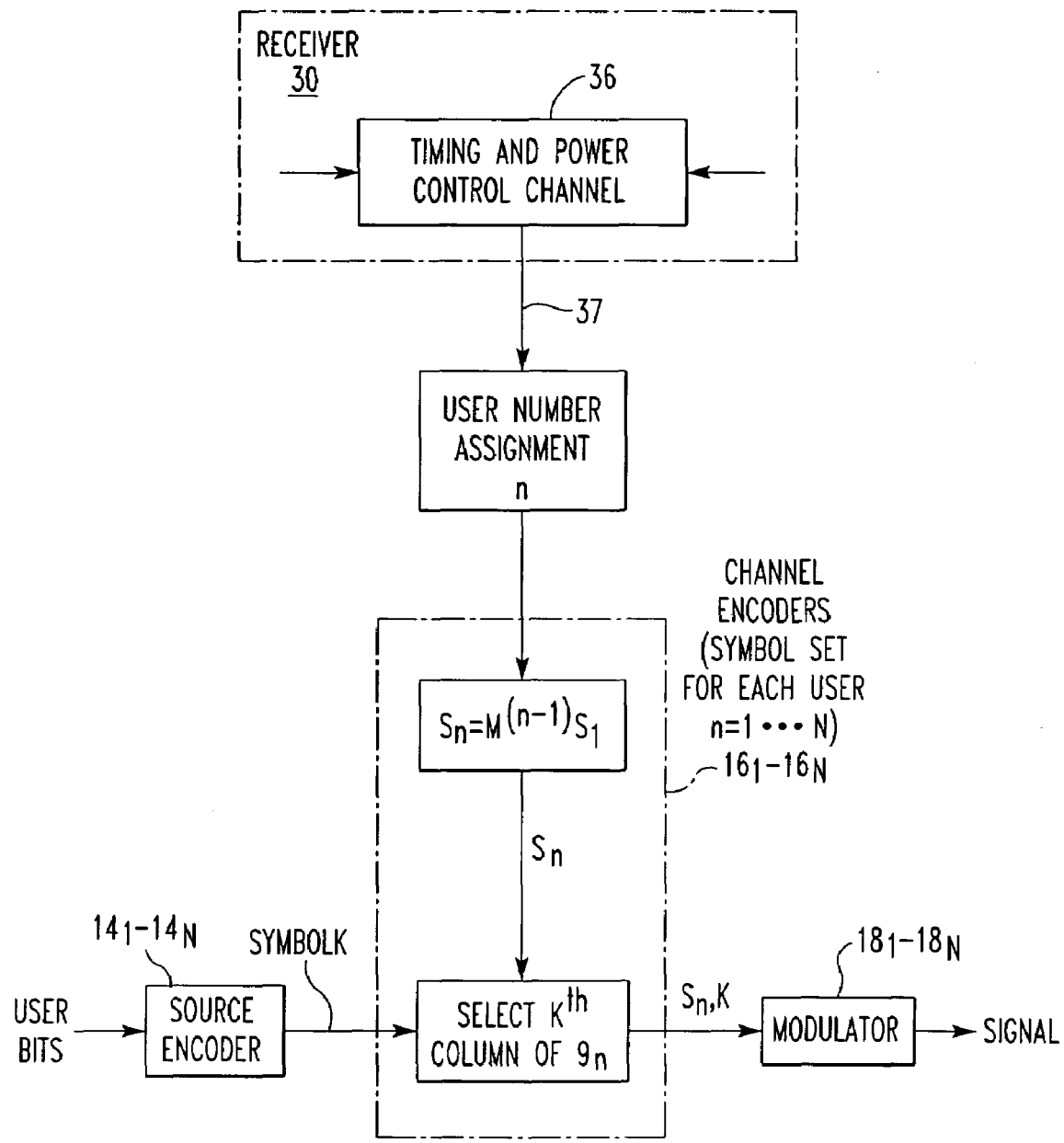
FIG. 5 shows a signal flow chart of a method of encoding each user in the channel encoder of FIG. 1 of the multi-access communication system.
Figure 6A:
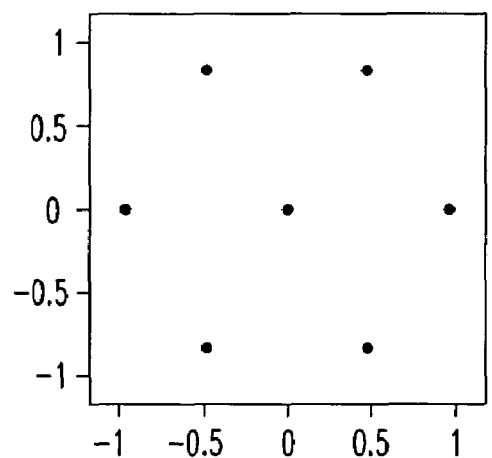
FIGS. 6A–6D show composite receive constellations for one to four users respectively with the received points falling exactly on the hexagonal lattice.
Figure 6B:
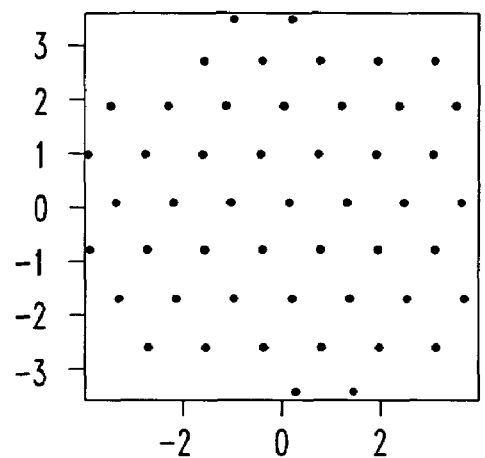
Figure 6C:
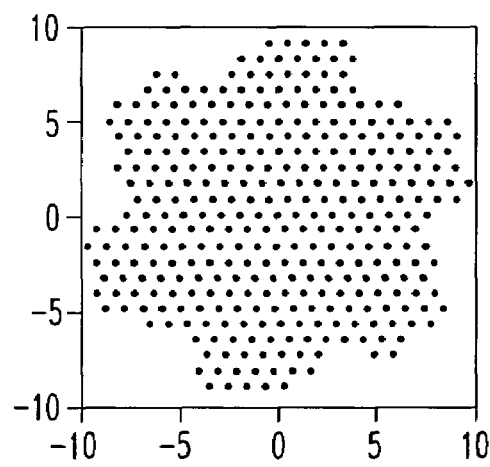
Figure 6D:
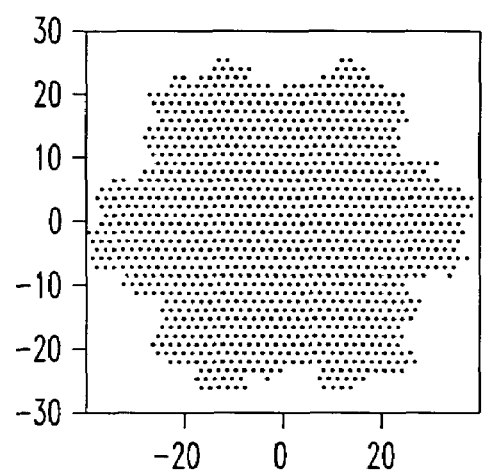

Referring to FIG. 5, a signal flowchart is shown for a method of encoding each user in the channel encoder $16_1$–$16_N$. The user assignment n, for n=1 ... N, is transmitted by the receiver 30 over the timing and power control 36, and channel 37, and the channel encoder $16_n$ precalculates its matrix of symbol constellation points $S_n$ before receiving any symbols from the source encoder $14_n$. Either the recursion equation (7) or the form $S_n = M^{n-1} S_1$ may be used, and the results are the same and the equations are mathematically equivalent.

Referring again to FIG. 1, when the source encoder $14_n$ begins sending the symbol stream, each alphabetic symbol is converted to its geometric representation in the channel encoder $16_n$ by simply selecting the corresponding column of $S_n$ and sending this to the modulator $18_n$.

Referring to FIG. 6A–6D, the utility of the specially designed symbol sets given by equation (7) is shown. In particular, FIGS. 6A–6D show the composite receive constellations, for one user (FIG. 6A), two users (FIG. 6B), three users (FIG. 6C), and four users (FIG. 6D) (i.e. $S_1$ through $S_1 \oplus \ldots \oplus S_4$). The received points fall exactly on the hexagonal lattice. Thus, this very simple multiuser symbol assignment strategy has the property that the composite constellation is a subset of the optimal hexagonal lattice. The composite receive constellation looks like "snowflakes". The pattern is known mathematically as a "Gosper island", and is known to tile the plane, which provides further evidence that the new multiuser symbol set approach is efficient; each location on the hexagonal lattice within the snowflake-shaped boundary is used exactly once, by any number of users.

Figure 7:
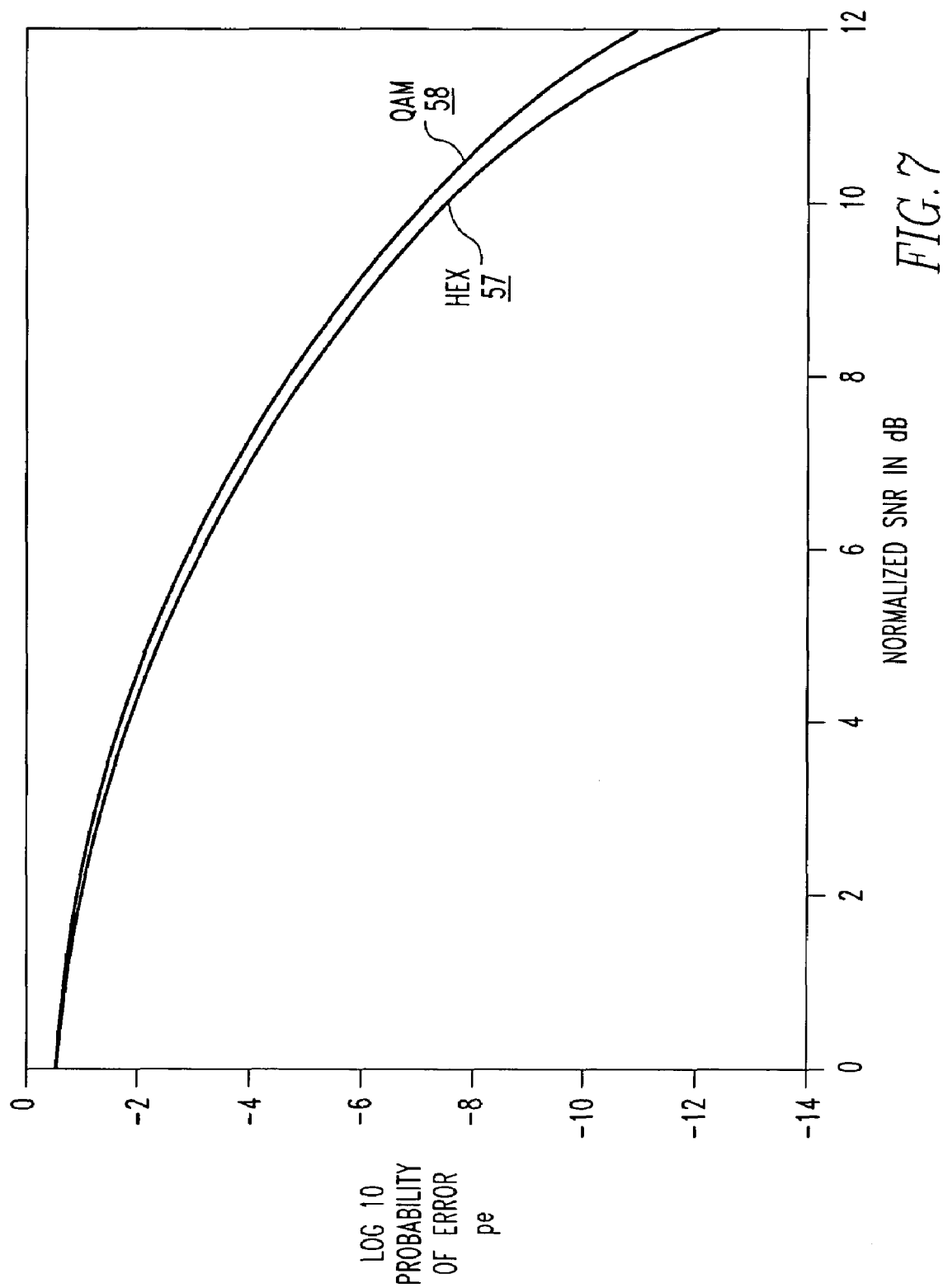
FIG. 7 is a graph showing the probability of error versus rate-normalized SNR for QAM and hexagonal multiuser packing methods.

Referring to FIG. 7, the probability of error, $P_e$, versus the rate normalized SNR in dB, $SNR_{norm}$, for the hexagonal (HEX) 57 and QAM 58 packing methods is shown. This standard method of analysis was performed in using the method described in DIGITAL COMMUNICATION, Second Edition, by Edward A. Lee and David G. Messerschmidt, Section 8.7 Capacity and Modulation, pages 344–357, 1994. Using this reference, we have that for QAM, $P_e$ and $SNR_{norm}$ are approximately related by $Pe = 4 \cdot Q(\sqrt{3 \cdot SNR_{norm}})$, where Q(x) is the area in the tail of a unit-variance Gaussian to the right of x. For the hexagonal lattice, the relationship is approximately $Pe = 6 \cdot Q(\sqrt{3.5 \cdot SNR_{norm}})$. These relationships are plotted in FIG. 7, which shows that the hexagonal method is clearly superior over the usable rate-normalized SNR range.

Figure 8:
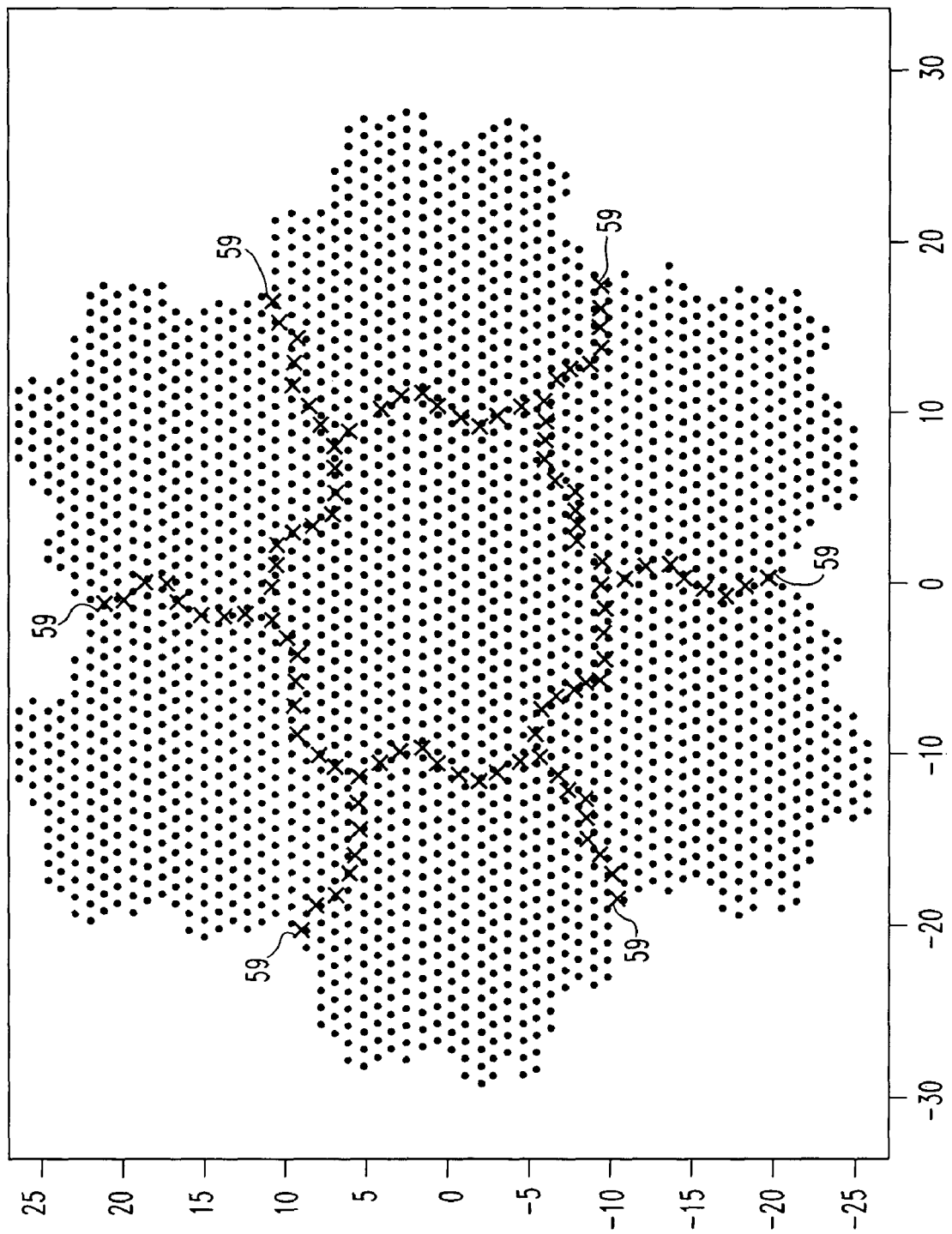
FIG. 8 shows a hexagonal lattice with errors for a successive interference cancellation (SIC) decoding method for N=4 users.

Referring to FIG. 8, a hexagonal lattice is shown with decoding errors marked by "X" 59, for a prior-art successive interference cancellation (SIC) decoder. Recall that the SIC decoder decodes the most powerful user first, followed by the next most powerful, and so on. FIG. 8 shows that if this decoder is employed for the hexagonal multiuser constellation, decoding errors result, even if there is no channel noise. The problem becomes compounded if additional users enter the MAC system. Thus, the prior-art is unacceptable for decoding the bandwidth efficient hexagonal multiuser constellation.

Figure 9:
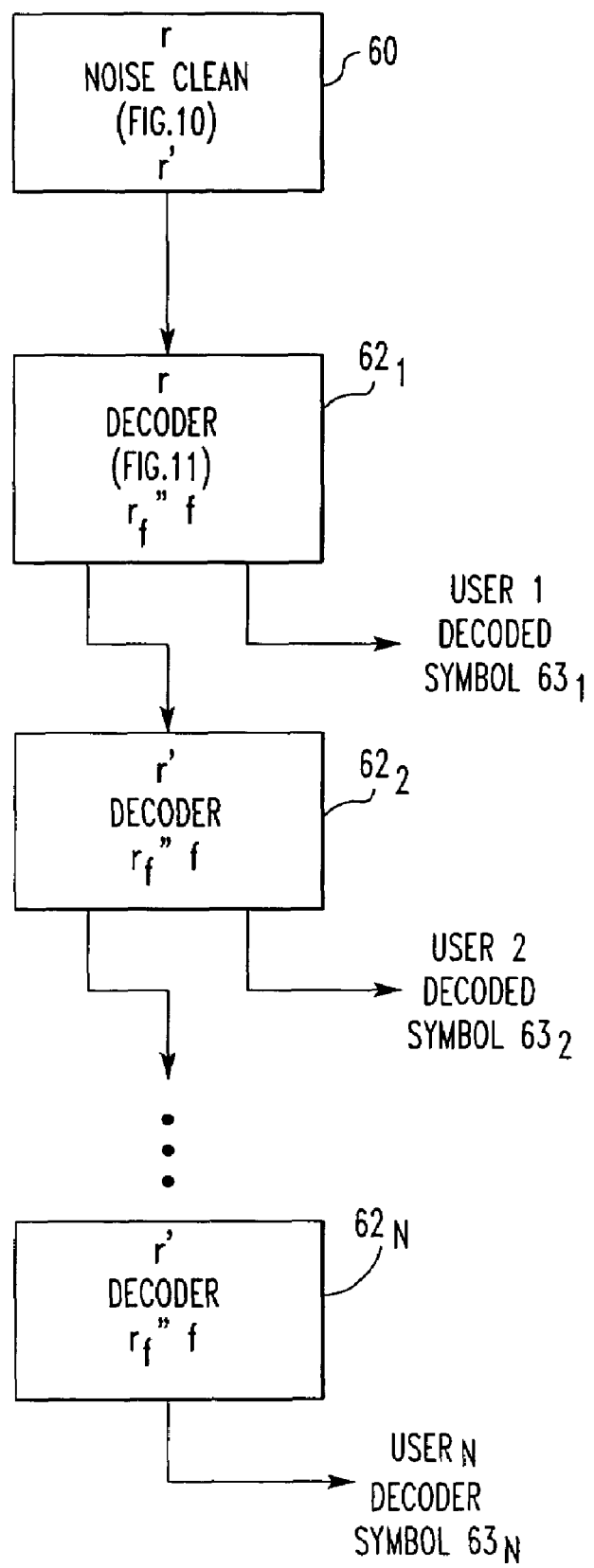
FIG. 9 shows a flow chart for the method of decoding each user in the channel decoder of FIG. 1.

Referring now to FIG. 9, a flow chart is shown for the method of decoding each user in the channel Decoder 38 (FIG. 1). The method takes advantage of the scale recursive structure of the multiuser constellation for N users. The least powerful user (i.e. user 1) is decoded first, and then this information is used to decode the next least powerful user (user 2), etc.

The first step is to perform a Noise Clean 60 operation to obtain a noise-cleaned received vector (r'). Next, the noise-cleaned received vector (r') is decoded in a series of Decoder $62_1$–$62_N$ operations whereby the User 1 Decoded Symbol $63_1$, the User 2 Decoded Symbol $63_2$, etc. are obtained. Each Decoder $62_1$–$62_N$ operation removes the least most powerful remaining user from the system, thereby reducing the complexity of decoding the remaining users. Each Decoder 62 operation places the remaining multiuser constellation onto the original hexagonal lattice.

Figure 10:
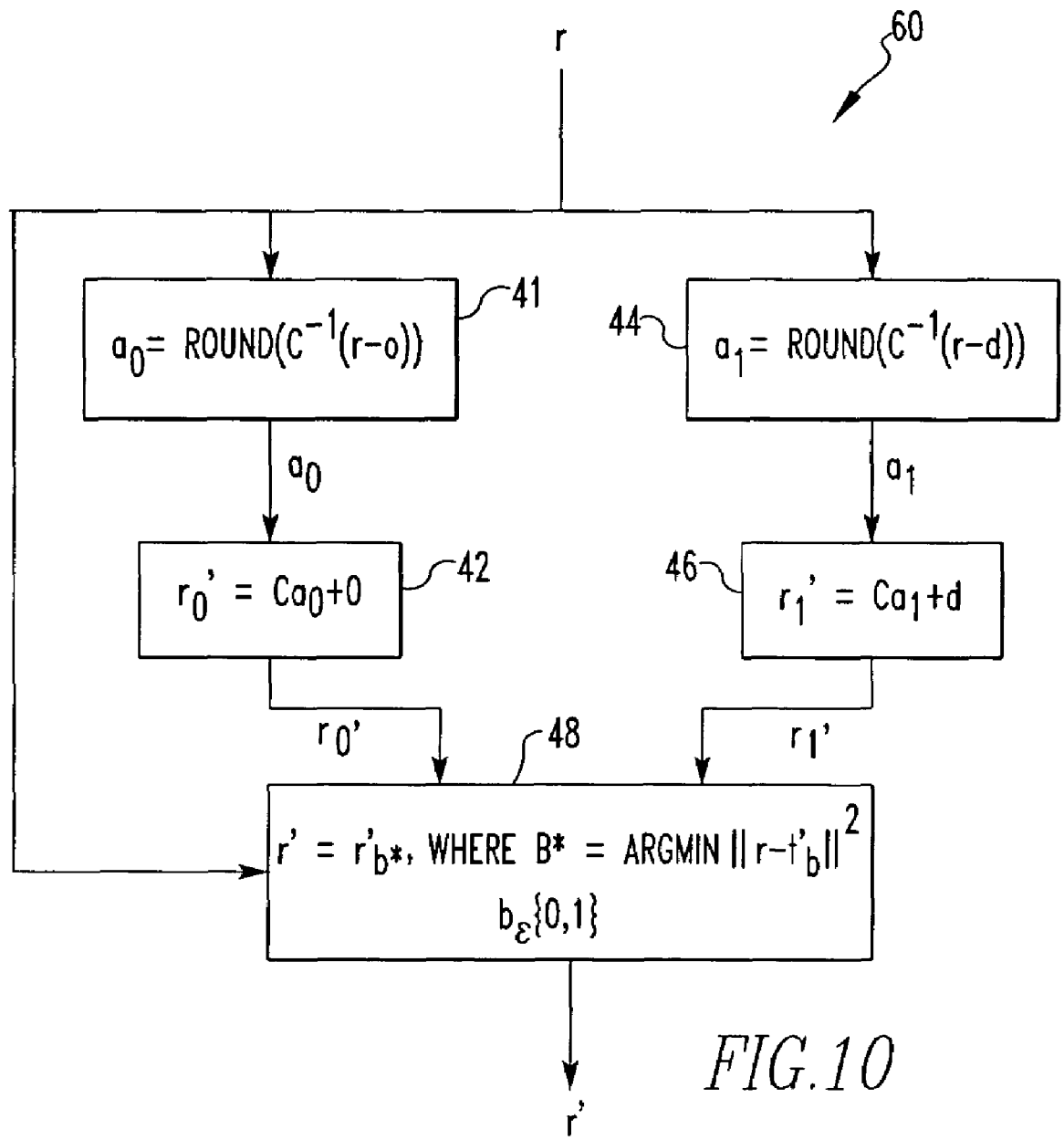
FIG. 10 shows a flow chart for the step of noise cleaning a received signal or vector in FIG. 9 and FIG. 11.

Referring to FIG. 10, a flow chart is shown for the steps of performing the Noise Clean 60 operation for the received signal or vector r in FIG. 9 and FIG. 11. Unlike traditional optimal multiuser decoders, it is not necessary to test every point in the constellation; rather, properties of the hexagonal lattice are used to greatly simplify this operation. The key is the fact that the hexagonal lattice can be partitioned into two rectangular sublattices 70, 72 (FIG. 2). Points on the two dimensional hexagonal lattice are ideally given by equations (3), (4), and (5). A noisy r is efficiently projected onto the hexagonal lattice by first projecting it onto each of the two rectangular sublattices. Projection onto the rectangular sublattices is extremely easy; for each b=0 and b=1, the optimal lattice index vector is calculated as follows:

$$a_b = \text{round}(C^{-1}(r - bd)) \quad (9)$$

where "round" indicates component wise rounding to the nearest integer. With the $a_0$ calculated as shown in FIG. 10, block 41 and $a_1$ in block 44 so calculated, "cleaned" received vectors are calculated for the assumed sublattices:

$$r'_b = Ca_b + bd, \text{ for } b=0,1. \quad (10)$$

These operations are performed for both sublattices, given by Block 42 for b=0 and block 46 for b=1, producing two possible cleaned received vectors, $r'_0$ and $r'_1$. The one that is closer to the actual receive vector r in the squared-error sense is chosen in block 48 as the true cleaned receive vector. This is mathematically represented as $$r' = r'_{b*}, \text{ where } b^* = \underset{b \in \{0,1\}}{\operatorname{argmin}} \|r - r'_b\|^2 \qquad (11)$$

Referring to FIG. 11, a flow chart is shown for the step of performing a least powerful remaining user Decoder $62_1$–$62_N$ operations. To decode a user, we test all seven possible symbols from $S_1$ by performing tests $50_1$–$50_7$ in turn. These tests operate on r', the vector input to the Decoder $62_1$–$62_N$ blocks. The tests are performed by subtracting the seven possible symbols in turn from r', and then de-rotating and de-scaling these resulting differences by multiplying the differences by $M^{-1}$. This operation is mathematically represented as $$r''_k = M^{-1}(r' - s_{1,k}), \text{ for } k=1,2,\ldots,7. \qquad (12)$$

thereby forming seven possible vectors $r_1''$, $r_2''$, ..., $r_7''$. Next, each of the received vectors, $r_1''$–$r_7''$ is projected onto the nearest hexagonal lattice point in turn using a Noise Clean $60_1$–$60_7$ operation, identical to the Noise Clean 60 operation, which produces vectors $r'''_k$, for k=1,2, ... ,7. The next step 52 compares the squared distances $|r_1'' - r_1'''|^2$, ... $|r_7'' - r_7'''|^2$ and chooses the smallest. If exact arithmetic is used, the smallest distance is identically zero, and for exact arithmetic systems, an alternative formulation of step 52 is to select the k such that $r_k'' = r_k'''$. For non exact arithmetic systems, such as floating point and some custom hardware implementations, the minimum squared distance formulation is preferred. Letting f represent the k thus chosen, f is outputted from the Decoder $62_1$–$62_N$ blocks as the symbol that this user sent. The corresponding $r_f''$ calculated in equation (12) is also outputted from the Decoder $62_1$–$62_N$ blocks as shown in FIG. 9.

Referring again to FIG. 9, with User 1 decoded by the Decoder $62_1$, User 2 is decoded by the Decoder $62_2$ step by using $r_f''$ calculated by equation (12) for User 1, to obtain the symbol sent by User 2. This step is analogous to the Decoder $62_1$ step for User 1 only there are now only N−1 users, rather than N. User 2 now takes the place of User 1, and so on, up to User N taking the place of N−1. Therefore, the steps of FIG. 11 are repeated to iteratively decode the rest of the Users 2, 3, ..., N.

While the new encoding method provided herein appears to require that each user be allocated an equal share of the available capacity of the channel, there are options for altering the share of capacity. While there is likely some transmitter/receiver overall capacity, within this overall capacity there is a way to reallocate a portion of the capacity or increase the symbol throughput by using "virtual" users. For example, creating "virtual" users allows for unequal rates as follows by being able to combine a number of virtual users having a fixed capacity to form a real user with the combined capacity of the virtual users.

The desired fraction of the sum capacity allocated to users 1, ..., N is denoted by $F_1$, ..., $F_N$, and restricted to rational numbers, represented by reduced fractions. Multiplying the numerators of the $F_i$ by the least common multiple of the denominators of the $F_i$, and dividing by the greatest common divisor, gives a set of integers. Each integer corresponding to a single user represents the number of "virtual" users that will be assigned to that single user. The symbol set for the real user is the direct sum of the symbol sets corresponding to its virtual users. In this way, unequal desired rates can be realized. For example, if a user one has three virtual users, and user two has two virtual users, then user ones's symbol set could be $S_1 \oplus S_2 \oplus S_3$, with 343 symbols ($7^3$) in all, and user two's symbol set will be $S_4 \oplus S_5$, with 49 symbols ($7^2$) in all.

This invention has been disclosed in terms of certain embodiments. It will be apparent that many modifications can be made to the disclosed apparatus without departing from the invention. For example, the present invention can be implemented in hardware or software. Therefore, it is the intent of the appended claims to cover all such variations and modifications as come within the true spirit and scope of this invention.

What is claimed is:

1. A method of channel encoding in a multiple access communications system comprising the step of: encoding alphabetic symbols from a plurality of users into a predetermined geometric representation of a symbol constellation in a scale recursive manner wherein a combined receive signal always falls onto a hexagonal lattice.

2. The method as recited in claim 1, wherein the step of encoding alphabetic symbols into the predetermined geometric representation of the symbol constellation comprises the step of providing a symbol set ($S_n$) for each of the users n, where n=1 ... N.

3. The method as recited in claim 1, further comprising the step of creating a plurality of virtual users and at least one real user, wherein each said real user comprises at least one of the virtual users.

4. The method as recited in claim 3, wherein each of said virtual users has a virtual user symbol set, and each said real user has a real user symbol set, and wherein each said real user symbol set is a direct sum of at least one said virtual user symbol set.

5. A method of channel encoding and channel decoding in a multiple access communications system comprising the steps of:

encoding alphabetic symbols from a plurality of users into a predetermined geometric representation of a symbol constellation in a scale recursive manner wherein a combined receive signal always falls onto a hexagonal lattice; and decoding a received predetermined geometric representation of a multiuser symbol constellation of each of said users into a replication of each user's individual symbol constellation comprising a number of computations that are linearly proportional to the number of said users.

6. The method as recited in claim 5 wherein the step of encoding alphabetic symbols into a predetermined geometric representation of a symbol constellation comprises the step of providing a symbol set ($S_n$) for each user n, where n=1 ... N.

7. The method as recited in claim 5, further comprising the step of creating a plurality of virtual users and at least one real user, wherein each said real user comprises at least one of said virtual users.

8. The method as recited in claim 7, wherein each of said virtual users has a virtual user symbol set, and each said real user has a real user symbol set, and wherein each said real user symbol set is a direct sum of at least one said virtual user symbol set.

9. The method as recited in claim 5 wherein said means for decoding comprises performing a series of decoding steps wherein a least most powerful remaining user is decoded and removed at each of said steps.

10. A method of channel decoding in a multiple access communication system comprising the steps of:

decoding a received signal comprising a plurality of users into a predetermined geometric representation of a multiuser symbol constellation for each of said users to obtain a replication of an individual symbol constellation for each of said users, wherein said decoding comprises performing a series of decoding steps wherein a least most powerful remaining user is decoded and removed at each of said steps.

11. The method as recited in claim 10, further comprising the step of removing channel noise from said received signal so as to move the received signal onto a hexagonal lattice.

12. The method as recited in claim 11, wherein the step of removing noise from said received-signal comprises the step of partitioning the hexagonal lattice into two rectangular sublattices.

13. The method as recited in claim 10 wherein the steps of decoding said least most powerful user comprising the steps of:

testing each transmitted symbol, $s_{1,k}$, for k=1, ..., 7, to determine the least most powerful user symbol by subtracting each possible symbol from a noise cleaned received signal, r', de-rotating and de-scaling a difference resulting from the subtracting by multiplying each said difference by a matrix, $M^{-1}$;

performing a noise clean operation on each of the possible least most powerful users received symbols, $r_k''$, by projecting the received signals, $r_k''$, onto a nearest hexagonal lattice point producing a set of hypothesized receive vectors with the least most powerful user removed, $r_k'''$; and comparing a squared distance, $|r_1''-r_1'''|^2, ..., |r_7''-r_7'''|^2$, andchoosing symbol f corresponding to a minimum squared distance as the least most powerful user's symbol and generating the receive vector, $r_f''$, for a next decoding step.

14. The method as recited in claim 13 wherein the step of multiplying each difference by a matrix, $M^{-1}$, comprises the step of forming the matrix, $M^{-1}$, by inverting a matrix, M, which is the matrix that scales and rotates the constellations from one user to a next most powerful user.

15. The method as recited in claim 11, wherein the step of removing channel noise from the received signal comprising the steps of:

partitioning the hexagonal lattice into two sublattices displaced by a vector, d;

calculating a lattice index vector, $a_b$, for projecting the received signal, r, onto one of the sublattices by solving an equation $a_b$=round ($C^{-1}$(r−bd)), for b=0,1 where, $$C = \begin{bmatrix} 1 & 0 \\ 0 & \sqrt{3} \end{bmatrix}$$

is a sublattice aspect ratio;

calculating possible cleaned received vectors, $r'_0$ and $r'_1$, by solving an equation $r'_b$=$Ca_b$+bd, for b=0,1; and determining which one of the cleaned received vectors, $r'_0$ and $r'_1$, is closer to the received vector, r, in a square error sense.

16. A channel encoder and channel decoder for multiple access communication systems having a plurality of users, comprising:

a plurality of channel encoders that encode symbols from each of said users into a multiuser symbol constellation for each of said users, wherein said multiuser symbol constellation is a subset of a hexagonal lattice; and a channel decoder that decodes said multiuser symbol constellation into said symbols for each of said users.

17. The channel encoder and channel decoder according to claim 16, wherein said plurality of channel encoders that encode symbols from each of said users into a multiuser symbol constellation for each of said users uses a recursion equation $S_n = M^{n-1} S_1$ wherein users are numbered n=1 ... N.

18. The channel encoder and channel decoder according to claim 16, wherein said channel encoders are contained within a corresponding plurality of transmitters, each of said transmitters comprising a source encoder and a modulator coupled to said channel encoder, wherein a modulated output from each said modulator is transmitted by an antenna.

19. The channel encoder and channel decoder according to claim 16, wherein said channel encoders are contained within a corresponding plurality of transmitters, each of said transmitters comprising a source encoder and a modulator coupled to said channel encoder, wherein a modulated output from each said modulator is directly coupled to said channel decoder.

20. The channel encoder and channel decoder according to claim 16, wherein said channel decoder is contained within a receiver section, said receiver section comprising an antenna coupled to a demodulator, said demodulator coupled to a reconstruction section, said reconstruction section coupled to said channel decoder, and a plurality of source decoders for each of said users coupled to said channel decoder.

21. The channel encoder and channel decoder according to claim 16, wherein said channel decoder uses a least most powerful remaining user decoding.

22. The channel encoder and channel decoder according to claim 16, further comprising a timing and power control section coupled to said demodulator and said channel decoder, wherein said timing and power control section transmits power and timing information to a transmitter.

23. The channel encoder and channel decoder according to claim 16, wherein said plurality of channel encoders create a plurality of virtual users having corresponding virtual user symbol sets, and at least one real user having a corresponding real user symbol set, wherein said real user symbol set is a direct sum of a number of said virtual user symbol sets.

* * * * *